Patented Dec. 14, 1948

2,456,379

UNITED STATES PATENT OFFICE 2,456,379

2-AMINO-5-METHYL PYRIDINE AND PROCESS OF MAKING IT

Francis E. Cislak and Arthur L. Kranzfelder, Indianapolis, Ind., assignors to Reilly Tar & Chemical Corporation, Indianapolis, Ind., a corporation of Indiana No Drawing. Application January 11, 1946, Serial No. 640,672

2 Claims. (Cl. 260—296)

Our invention relates to a new organic compound and to the process of making it. More particularly it relates to 2-amino-5-methylpyridine and to the process of making it.

We have found that this previously unknown derivative of pyridine can be produced by the action of sodamide on 3-methylpyridine according to the processes herein described.

Without limiting ourselves to any particular form of apparatus, we prefer to use a stainless steel autoclave, having a stirrer therein, a reflux condenser, means for introducing sodamide and a means for introducing the 3-methylpyridine.

The sodamide used in carrying out our process may be made in any suitable manner and it may be dispersed in a finely divided state in any suitable liquid dispersing medium, such as xylene, tetralin, dimethylaniline, and the like.

The following examples illustrate our invention.

*Example 1.*—About 320 grams of finely divided sodamide is dispersed in about 1500 cc. of anhydrous xylene. This mixture is heated to about 130°–140° C. While stirring the hot dispersion of sodamide in xylene, 680 cc. of anhydrous 3-methylpyridine (98%) is slowly added. As the 3-methylpyridine reacts with the sodamide, hydrogen gas is evolved thereby increasing the pressure within the reaction vessel; the pressure is allowed to rise to about 150 lbs. per sq. in. and is prevented from rising higher by then releasing the hydrogen as it is formed. The temperature of the reaction mixture is increased to about 150°–170° C.; this temperature is maintained throughout the remainder of the reaction period. After all the 3-methylpyridine is added, which addition requires about one-half hour, the reaction mixture is stirred for about three hours. Then about two-thirds of the xylene is removed by distillation under vacuum. The residue remaining after the bulk of the xylene has been removed is treated first with about 125 cc. of methanol, and then with about 700 cc. of water. The resulting mixture is removed from the reaction vessel and allowed to stratify into two layers, an aqueous layer and a non-aqueous layer. The non-aqueous layer is separated and subjected to fractional distillation through an efficient fractionating column having a great number of plates to effect the difficult separation. By such fractional distillation we obtain 2-amino-3-methylpyridine and 2-amino-5-methylpyridine.

*Example 2.*—About 170 grams of finely divided sodamide is dispersed in about 750 cc. of an inert anhydrous liquid dispersing medium, such as xylene. The temperature of the resulting mixture is then raised to about 130°–140° C. The hot dispersion of sodamide is stirred and to it is gradually added about 350 cc. of anhydrous 3-methylpyridine (98%). After all the 3-methylpyridine has been added, which addition requires about 10–15 minutes, the reaction mixture is stirred for about 4–5 hours, the temperature of the reaction mixture being maintained at about 130° C. Then about 600 cc. of xylene is removed by distillation under vacuum. The residue remaining after the removal of the 600 cc. of xylene is treated first with about 100 cc. of methanol, and then with about 350 cc. of water. The resulting mixture is removed from the reaction vessel, and upon standing stratifies into two layers, an aqueous layer and non-aqueous layer. The non-aqueous layer is separated and subjected to fractional distillation thru an efficient fractionating column having a great number of plates to effect the difficult separation. By such fractional distillation we obtain 2-amino-3-methylpyridine and 2-amino-5-methylpyridine.

The 2-amino-5-methylpyridine boils at about 226.9° C. and has a freezing point of about 76° C. It is useful in the preparation of pharmaceuticals, insecticides, fungicides, and in organic syntheses.

Contrary to the information given in the literature [Seide, Berichte 57, 1802 (1924)] we find that 2-amino-3-methylpyridine boils at about 221.5° C. and crystallizes at about 33.5° C.

We claim as our invention:

1. The process of preparing crystalline 2-amino-5-methylpyridine which comprises reacting 3-methylpyridine with sodamide isolating the reaction products containing 2-amino-5-methylpyridine and 2-amino-3-methylpyridine, fractionally distilling said mixture and recovering a crystalline 2-amino-5-methylpyridine.

2. The process of preparing crystalline 2-amino-5-methylpyridine which comprises reacting 3-methylpyridine with sodamide in an inert liquid dispersing medium, adding water to isolate the reaction products containing 2-amino-5-methylpyridine and 2-amino-3-methylpyridine, fractionally distilling said mixture and recovering a crystalline 2-amino-5-methylpyridine.

FRANCIS E. CISLAK.
ARTHUR L. KRANZFELDER.

REFERENCES CITED

The following references are of record in the file of this patent:

Seide, Berichte de deut Gess., vol. 57, pp. 1802 and 1803.